United States Patent [19]

Delwel

[11] Patent Number: 4,582,263
[45] Date of Patent: Apr. 15, 1986

[54] APPARATUS FOR MIXING OR GRANULATION OF PARTICLES

[75] Inventor: Francois Delwel, Dordrecht, Netherlands

[73] Assignee: Lever Brothers Company, New York, N.Y.

[21] Appl. No.: 556,741

[22] Filed: Nov. 30, 1983

[30] Foreign Application Priority Data

Dec. 2, 1982 [GB] United Kingdom ............... 8234380

[51] Int. Cl.$^4$ ............................................ B02C 17/00
[52] U.S. Cl. ........................................ 241/38; 241/284
[58] Field of Search .................... 241/38, 167, 284; 51/164.1, 328

[56] References Cited

U.S. PATENT DOCUMENTS 2,664,675 1/1954 Monica ................................ 241/284
2,812,541 5/1955 Webster et al.
3,682,569 8/1972 Vagin et al.
4,188,129 2/1980 Thompson ...................... 51/164.1 X
4,373,674 2/1983 Barrera et al. ...................... 241/38 X

FOREIGN PATENT DOCUMENTS 77684 of 1949 Czechoslovakia ................. 241/284
2072341 9/1971 France .
31484 5/1952 Luxembourg .

Primary Examiner—Mark Rosenbaum
Assistant Examiner—Timothy V. Eley
Attorney, Agent, or Firm—Lynne Darcy; James J. Farrell

[57] ABSTRACT

A drum granulator is described in which at least a part of the cylindrical outer wall is resilient. This can be achieved, for example, by forming the drum from steel and fitting it with a resilient rubber lining, which is exposed in way of circumferentially extending slots in the steel. The drum rotates past pivotted rollers which are allowed to descend abruptly onto the resilient part of the wall, dislodging any material which adhered to it.

7 Claims, 2 Drawing Figures

4,582,263

APPARATUS FOR MIXING OR GRANULATION OF PARTICLES

This invention relates to apparatus for mixing or granulation of particles.

BACKGROUND OF THE INVENTION

Apparatus for granulation of very small particles is now commonplace in industry. It is used, for example, in the preparation of "instantized" drinks and in the detergents industry for formation of special components such as enzyme granules, anti-foam granules or bleach components. In the detergents industry one of the most popular apparatus is a drum granulator, since in this type of apparatus it is easiest to arrange for the high throughput desired to be achieved with employment of minimum labour. Additionally, movement of material through a rotating drum is virtually plug flow, so it is easy to arrange sequential addition of coating materials so that layered granules can be built up. Rotating drums can also be used for simple mixing processes.

One of the difficulties with drum granulators is that in the process of granulating fine particles a sticky mass of powder may be formed which tends to adhere to the drum wall and has to be scraped off. However, in certain applications it is desirable to lift the powdered feed material to the top of the drum, in which case internal baffles are needed. In this case scraping of the wall is not possible and thick layers of wetted material will build up on the drum wall.

This disadvantage is overcome in the present invention by forming the drum wall from a resiliently flexible material and rotating the drum past an obstruction which deforms the wall.

SUMMARY OF THE INVENTION

Accordingly the present invention provides a drum granulator comprising an open-ended drum rotatable about its major axis past a spraying station arranged to spray liquid onto material in the drum, characterised in that the wall of the drum is formed at least partially from a resiliently flexible material, and is rotatable past deforming means arranged to permit alternate deformation and relaxation of the wall. It is preferred that the resiliently flexible portion of the wall is arranged within a rigid structure being for example a number of supporting rings, or an outer drum containing a plurality of discontinuous circumferentially extending slots, and that the deforming means comprises a roller mounted on an arm urged towards the exterior of the drum either resiliently or by gravity.

In one construction of a drum granulator in accordance with the invention the wall of the drum is formed from steel having a flexible rubber lining. The inner lining may be formed with baffles, although a plain flexible lining is optional.

The apparatus in accordance with the invention has been found to be useful in granulating complete detergent compositions and components for such compositions, and the tendency for material to adhere to the wall of the granulator during the granulation process has been found to be much reduced. It may also be used for simple mixing of either dry or sticky solid materials.

BRIEF DESCRIPTION OF THE DRAWINGS

The apparatus will be further described with reference to the accompanying drawings in which.

DETAILED DESCRIPTION OF THE INVENTION

Figure 1:
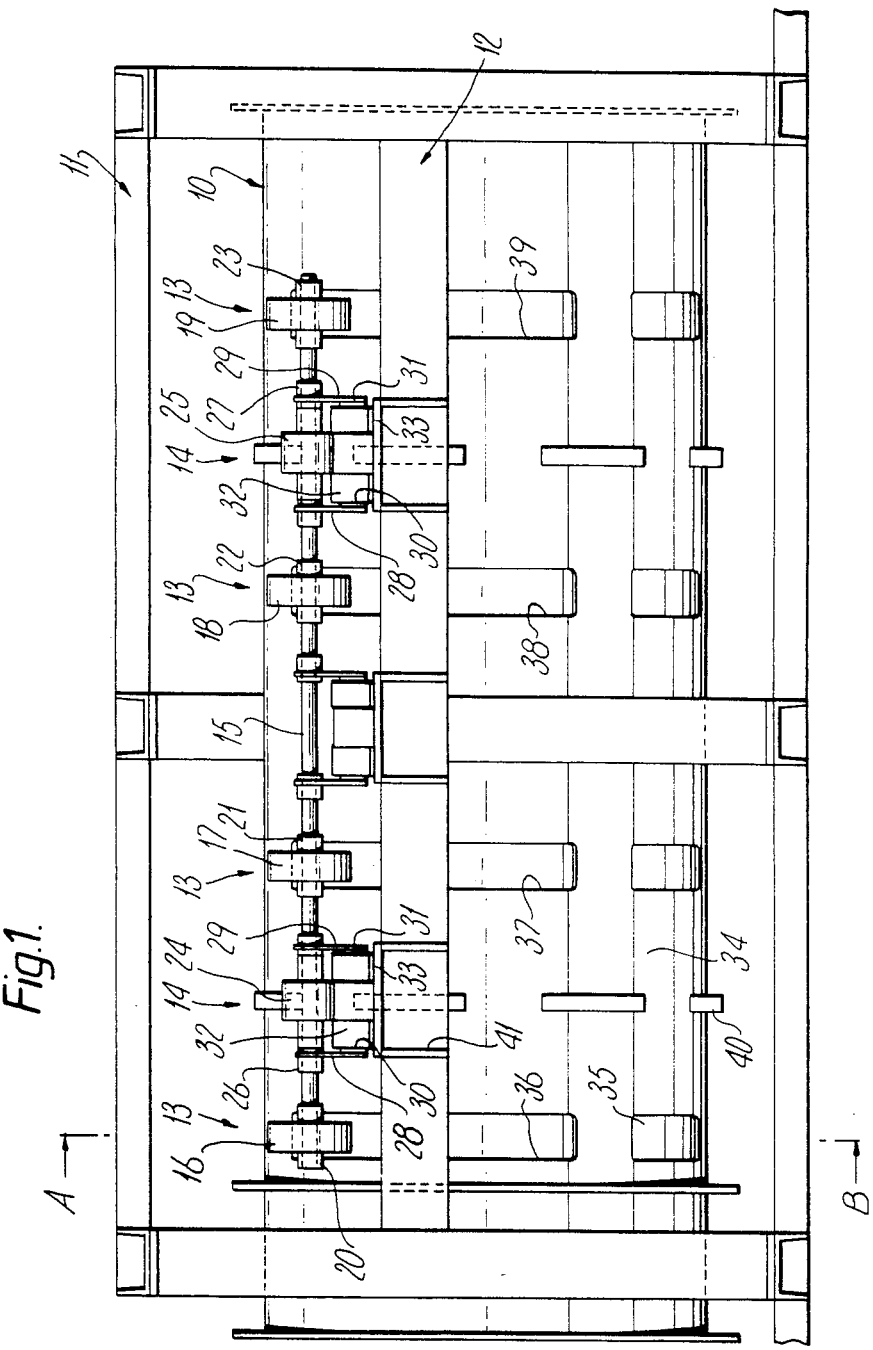
FIG. 1 is a side elevation of a granulator in accordance with the invention.

Referring first to FIG. 1 a cylindrical drum (10) is carried on a rectanguloid framework (11) formed from "U" section steel beams. The drum bears on a plurality of rubber wheels (not shown) rotatably mounted on the framework, and one of the wheels is rotatable by an external power source. At a height slightly above the mid-point of the drum (10) the framework (11) is provided with a horizontal carrier beam (12) which carries four sets of deforming means, shown generally as (13) and two sets of cam rollers shown generally as (14). Both the deforming means (13) and the cam rollers (14) generally comprise rollers fixed to a rotatable shaft (15) carried in brackets. Specifically the deforming means comprise four deforming rollers (16 to 19) carried on rotatable shaft (15) and axles (20 to 23). Similarly the cam rollers comprise rollers (24 and 25) of smaller diameter than the deforming rollers, carried on axles (26 and 27) attached to the outer ends of arms (28 and 29). The lower ends of arms (28 and 29) are attached to axles (30 and 31) retained on horizontal carrier beam (12) by housings (32 and 33) in a manner which permits pivoting movement.

The wall of the cylindrical drum (10) is formed of two layers, an outer steel layer (34) and an inner rubber one (35). In way of the deforming rollers (16 to 20) the outer steel layer (34) is cut away to form a plurality of discontinuous apertures (36 to 39). Similarly, in way of the cam rollers (24 and 29) the outer layer (34) of the drum carriers a discontinuous circumferentially extending cam (40).

Figure 2:
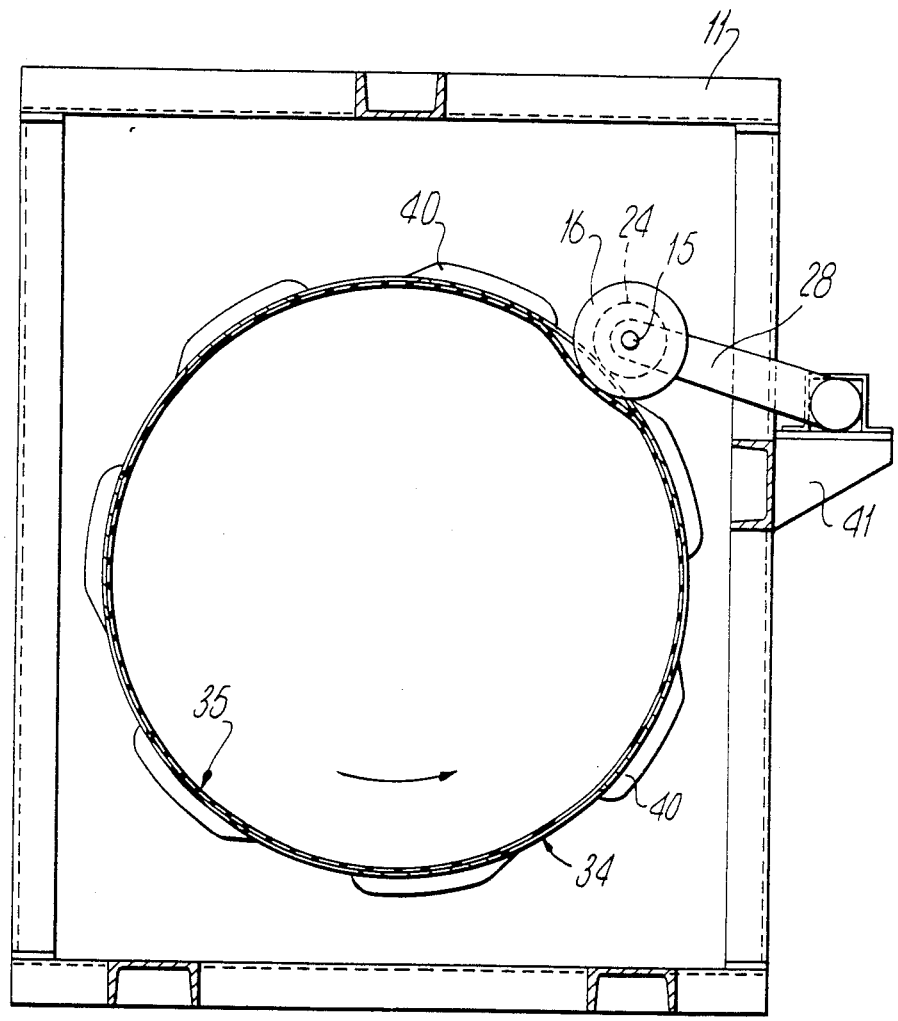
FIG. 2 is a section along the line A-B of FIG. 1.

Referring now to FIG. 2, the drum (10) is shown in section, with the deforming and cam rollers (16 to 20) and (24 and 25) respectively in position on the drum wall and with the deforming rollers in the process of deforming the rubber layer (35). The cam rollers (24 and 25) are shown as dotted lines since they lie behind the endmost deforming roller (16) and are consequently hidden from view. It can be seen from FIG. 2 that both sets of rollers are carried on shaft (15), which itself is carried at one end of arm (28), the other end of arm (28) being attached to a shaft (not shown) retained in housing (32) on carrier beam (12). Carrier beam (12) is supported on framework (11) by a trangular bracket (41).

Referring now to both FIGS. 1 and 2, the operation of the drum granulator is generally as follows: material to be granulated is fed into one end of the drum and sprayed with a liquid granulating agent by means not shown. Granulated material is extracted from the other end of the drum. As the drum rotates anti-clockwise as shown in FIG. 2, material both granulated and non-granulated tends to rise up the right-hand wall of the drum but is removed by gravity when dry and by the deforming and vibrating action of the rollers when sticky. Specifically, as the drum rotates cam roller (24) is pushed up onto cam (40), and since deforming roller (16) is carried on the same shaft (15) as the cam roller this too is pushed upwards to avoid the leading edge of apertures (36 to 39). When cam roller (16) falls off the cam as the drum rotates it causes the deforming roller to drop into one of the apertures (36) formed in the steel layer (34) of the drum and deform the rubber layer (35). The deforming action of the rollers causes material adhering to the walls of the drum to fall off and remain actively involved in the granulating process.

I claim:

1. A drum granulator comprising an open-ended drum carried on a framework and having a major axis about which it is rotatable in the framework past a spraying station arranged to spray liquid onto material in the drum, the drum having an outer layer of rigid material having a plurality of discontinuous apertures therein and an inner resiliently flexible layer, deforming means carried on the framework, and means adapted to cause the deforming means to enter the apertures in the outer layer of the drum as the drum rotates and deforms the resiliently flexible layer inwardly away from the outer layer.

2. A drum granulator according to claim 1 wherein said outer layer of rigid material comprises a plurality of rings.

3. A drum granulator according to claim 1 wherein the drum is formed from steel and has a flexible rubber lining.

4. A drum granulator according to claim 1 wherein said deforming means comprises a roller mounted on an arm.

5. A drum granulator according to claim 1 wherein the roller is resiliently urged toward the exterior of the outer layer of the drum.

6. A drum granulator according to claim 4 wherein the roller is urged toward the exterior of the outer layer of the drum by gravity.

7. A drum granulator according to claim 1 provided internally with at least one baffle.

* * * * *